US009646072B2

(12) United States Patent
Averbuch

(10) Patent No.: US 9,646,072 B2
(45) Date of Patent: May 9, 2017

(54) MULTIDIMENSIONAL DATASET QUERY PROCESSING

(71) Applicant: Panorama Software Inc., New York, NY (US)

(72) Inventor: Yaacov Averbuch, Natania (IL)

(73) Assignee: Panorama Software Inc., New York, NY (US)

( * ) Notice: Subject to any disclaimer, the term of this patent is extended or adjusted under 35 U.S.C. 154(b) by 64 days.

(21) Appl. No.: 14/194,827

(22) Filed: Mar. 3, 2014

(65) Prior Publication Data

US 2014/0250053 A1    Sep. 4, 2014

Related U.S. Application Data

(60) Provisional application No. 61/771,872, filed on Mar. 3, 2013.

(51) Int. Cl.
*G06F 17/00* (2006.01)
*G06F 17/30* (2006.01)

(52) U.S. Cl.
CPC .............. *G06F 17/30592* (2013.01)

(58) Field of Classification Search
CPC ......... G06F 17/30424; G06F 17/30592; G06F 17/30333
USPC ................. 707/600, 748, 722, 737
See application file for complete search history.

(56) References Cited

U.S. PATENT DOCUMENTS

| 5,987,422 | A  | * | 11/1999 | Buzsaki | G06Q 10/06311 |
| | | | | | 705/7.13 |
| 6,269,393 | B1 | * | 7/2001 | Yost | H04L 29/06 |
| | | | | | 709/201 |
| 6,430,545 | B1 | * | 8/2002 | Honarvar | G06Q 10/06 |
| | | | | | 705/35 |
| 6,581,068 | B1 | * | 6/2003 | Bensoussan | G06F 17/30457 |
| 6,684,206 | B2 | * | 1/2004 | Chen | G06Q 10/10 |
| 6,917,940 | B1 | * | 7/2005 | Chen | G06F 17/30592 |
| 7,007,020 | B1 | * | 2/2006 | Chen | G06F 17/30539 |
| | | | | | 705/7.29 |
| 7,558,784 | B2 | * | 7/2009 | Orumchian | G06F 17/30321 |
| | | | | | 707/713 |
| 7,743,071 | B2 | * | 6/2010 | Yang | G06F 17/30592 |
| | | | | | 705/51 |

(Continued)

OTHER PUBLICATIONS

Ceci, Michelangelo, et al., "OLAP over Continuous Domains via Density-Based Hierarchical Clustering", KES 2011, Part II, LNAI 6882, Springer-Verlag, Berlin, Germany, © 2011, pp. 559-570.*

(Continued)

*Primary Examiner* — Robert Stevens

(57) ABSTRACT

A method of processing a query. The method comprises providing at least one multidimensional dataset having at least three dimensions formed according to a plurality of data tables associating between a plurality of persons and a plurality of roles and comprising a plurality of cells, receiving a query defining at least one factual value coordinated by at least one of the plurality of cells, the at least one factual value representing a measure defined in at least one of the plurality of data tables, deriving at least one person from the plurality of persons, the at least one person being associated with the with multidimensional dataset with the at least one cell, and outputting an indication of the at least one person in response to the query.

18 Claims, 9 Drawing Sheets

(56) References Cited

U.S. PATENT DOCUMENTS

| | | | | |
|---|---|---|---|---|
| 7,856,458 | B2* | 12/2010 | Arras | G06F 17/30592 707/803 |
| 7,945,846 | B2* | 5/2011 | Beauchamp | G06F 17/30563 715/201 |
| 8,606,814 | B2* | 12/2013 | Graf | G06F 17/30592 707/770 |
| 8,811,597 | B1* | 8/2014 | Hackbarth | G06Q 10/06395 379/265.02 |
| 8,938,063 | B1* | 1/2015 | Hackbarth | H04M 3/00 379/265.03 |
| 2001/0018694 | A1* | 8/2001 | Iwamoto | G06F 17/30592 715/212 |
| 2004/0138931 | A1* | 7/2004 | Hope | G06Q 10/10 719/315 |
| 2006/0184410 | A1* | 8/2006 | Ramamurthy | G06Q 10/10 706/8 |
| 2008/0015919 | A1* | 1/2008 | Busse | G06Q 10/04 705/7.13 |
| 2010/0017395 | A1* | 1/2010 | Wayn | G06F 17/30386 707/E17.014 |
| 2010/0250566 | A1* | 9/2010 | Paul | G06F 17/30592 707/756 |
| 2011/0231359 | A1* | 9/2011 | Lerwich | G06F 17/30592 707/600 |
| 2011/0321033 | A1* | 12/2011 | Kelkar | G06F 9/44505 717/174 |
| 2013/0006969 | A1* | 1/2013 | He | G06F 17/30592 707/722 |
| 2013/0208880 | A1* | 8/2013 | Lovy | H04M 3/5175 379/265.03 |

OTHER PUBLICATIONS

Chaudhuri, Surajit, et al., "New Frontiers in Business Intelligence", The 37th International Conference on Very Large Data Bases, Seattle, WA, Aug. 29-Sep. 3, 2011, pp. 1502-1503.*

Chaudhuri, Surajit, et al., "An Overview of Data Warehousing and OLAP Technology", ACM SIGMOD Record, vol. 26, Issue 1, Mar. 1997, pp. 65-74.*

Fouché, Guy, et al., "Chapter 5: Advanced OLAP Modeling with SSAS", Foundations of SQL Server 2008 R2 Business Intelligence, Apress, Springer Science+Business, LLC, New York, NY, (c) 2011, pp. 107-129.*

Fugkeaw, Somchart, et al., "Chapter 15: Developing Access Control Model of Web OLAP over Trusted and Collaborative Data Warehouses", Emergent Web Intelligence: Advanced Information Retrieval, Springer-Verlag, London, UK, © 2010, pp. 393-413.*

Jensen, Mikael R., et al., "Discovering Multidimensional Structure in Relational Data", DaWaK 2004, LNCS 3181, Springer-Verlag, Berlin, Germany, © 2004, pp. 138-148.*

Malinowski, Elzbieta, "Improving Expression Power in Modeling OLAP Hierarchies", ICISTM 2009, CCIS 31, Springer-Verlag, Berlin, Germany, © 2009, pp. 19-30.*

Malinowski, Elzbieta, et al., "OLAP Hierarchies: A Conceptual Perspective", CAiSE 2004, LNCS 3084, Springer-Verlag, Berlin, Germany, © 2004, pp. 477-491.*

Priebe, Torsten, et al., "A Pragmatic Approach to Conceptual Modeling of OLAP Security", ER 2001, LNCS 2224, Springer-Verlag, Berlin, Germany, © 2001, pp. 311-324.*

Stolba, Nevena, et al., "The Security Issue of Federated Data Warehouses in the Area of Evidence-Based Medicine", ARES '06, Vienna University of Technology, Apr. 22-26, 2006, 11 pages.*

Zhen, Lu, et al., "Collaborative filtering based on workflow space", Expert Systems with Applications, vol. 36, Issue 4, May 2009, pp. 7873-7881.*

Dayal, Umeshwar, et al., "Data Mining Meets E-Business: Opportunities and Challenges", Proc. 1st SIAM International Conf. on Data Mining, Online Proceedings 2001, 43 pages.*

Chaudhuri, Surajit, et al., "An Overview of Business Intelligence Technology", Communications of the ACM, vol. 54, No. 54, No. 8, Aug. 2011, pp. 88-98.*

Chieu, Trieu C., et al., "Enterprise Telesales Opportunity Pipelines Performance Management", ICEBE '06, Shanghai, China, Oct. 24-26, 2006, pp. 433-441.*

Boulicaut, Jean-François, et al., "Query driven knowledge discovery in multidimensional data", DOLAP '99, Kansas City, MO, © 1999, pp. 87-93.*

Zaïane, Osmar R., et al., "Discovering Web Access Patterns and Trends by Applying OLAP and Data Mining Technology on Web Logs", ADL '98, Santa Barbara, CA, Apr. 22-24, 1998, pp. 19-29.*

Bellatreche, Ladjel, et al., "A Personalization Framework for OLAP Queries", DOLAP '05, Bremen, Germany, Nov. 4-5, 2005, pp. 9-18.*

* cited by examiner

```
With cell calculation aaa for '{}' as
'CalculationPassValue((Measures.currentmember), 0)',
font_name='cstr(count([NewSetY]))', solve_order=-200
,CALCULATION_PASS_NUMBER=1

Member [Product].[Product Categories].[pnValue] as '[Product].[Product
Categories].[All Products]',SolveOrder = 27

Member [Product].[Product Categories].[pnOrder Count*1] as
'iif(  [Product].[Product Categories].[oceGrowthCond], cstr(50 * (5 +
(Measures.currentmember is [Measures].[Order Count]) *
int(5*([Product].[Product Categories].[ocegrowth]-(-.377450980392157-
.01))/( 2.77638640429338+.01-(-.377450980392157-.01))) )) +
"<{BUE}>1{C_E}" +"||"+ cstr([Product].[Product Categories].[oceGrowth])
+"||"+ [Date].[Calendar].Prevmember.name +"||"+ cstr(([Product].[Product
Categories].[pnValue],[Date].[Calendar].Prevmember)) +"||"+
[Date].[Calendar].currentmember.name +"||"+ cstr(([Product].[Product
Categories].[pnValue],[Date].[Calendar].currentmember)) +"||"+
"Date.Calendar", null)' ,SolveOrder = 27

Member [Product].[Product Categories].[oceGrowth] As
'(([Product].[Product Categories].[pnValue])-([Product].[Product
Categories].[pnValue],[Date].[Calendar].Prevmember)) /
abs(([Product].[Product
Categories].[pnValue],[Date].[Calendar].Prevmember))'

, SolveOrder = 27

// Add calculation for getting delta between periods
Member [Product].[Product Categories].[oceDelta] As '

(([Product].[Product Categories].[pnValue])-([Product].[Product
Categories].[pnValue],[Date].[Calendar].Prevmember))  '

, SolveOrder = 27

// Add to each tuple the cell coordinates. If one of the coordinates
member is of type person ,do not add it set [Coordinates] as {
     ([Date].[Calendar].[Month].&[2023]&[3],[Sales Territory].[Sales
Territory].[Group].&[North America],[Product].[Product
Categories].[oceGrowth]), ([Date].[Calendar].[Month].&[2023]&[3],[Sales Territory].[Sales
Territory].[Group].&[North America],[Product].[Product
Categories].[oceDelta])}
```

FIG. 7A

```
// create a string with two entries for each person
Member [Product].[Product Categories].[oceFP] As cstr(aggregate([Sales Territory].[Sales Territory].[Group].&[North
America] ,[coordinates].item(0))) + "|" + cstr(aggregate([Sales Territory].[Sales Territory].[Group].&[North
America] , [coordinates].item(1))) + "|"

, SolveOrder = 27

Member [Product].[Product Categories].[oceGrowthNE] As
'iif(IsEmpty([Product].[Product Categories].[pnValue]) or
IsEmpty(([Product].[Product
Categories].[pnValue],[Date].[Calendar].Prevmember)) or
([Product].[Product Categories].[pnValue],[Date].[Calendar].Prevmember)=0
, null, [Product].[Product Categories].[oceGrowth])'

, SolveOrder = 27

Member [Product].[Product Categories].[oceGrowthCond] As
'iif(([Product].[Product
Categories].[pnValue],[Date].[Calendar].Prevmember)=0, null,
(([Product].[Product Categories].[pnValue])-([Product].[Product
Categories].[pnValue],[Date].[Calendar].Prevmember))  /
abs(([Product].[Product
Categories].[pnValue],[Date].[Calendar].Prevmember))< -5/100 )'

, SolveOrder = 27

Set [Expand Date.Calendar] As '{[Date].[Calendar].[Calendar
Year].&[2023],[Date].[Calendar].[Calendar
Semester].&[2023]&[1],[Date].[Calendar].[Calendar
Semester].&[2023]&[2],[Date].[Calendar].[Calendar Quarter].&[2003]&[1]}'

Set [Hidden Date.Calendar] As '{[Date].[Calendar].[Calendar
Year].&[2021],[Date].[Calendar].[Calendar
Year].&[2022],[Date].[Calendar].[Calendar Year].&[2024]}'

Set [Expand Sales Territory.Sales Territory] As '{}'

Set [SetAxisX] As '{HIERARCHIZE ( Except( Except (

{ [Date].[Calendar].[Calendar Year].AllMembers ,Generate({Expand
Date.Calendar],{[Date].[Calendar].CurrentMember.Children}) } ,

[Expand Date.Calendar] )

, [Hidden Date.Calendar] ) )}
```

FIG. 7B

```
Set [NewSetX] As '{NonEmpty([SetAxisX],[NewSetY] * {/*pnv1*/
[Product].[Product Categories].[pnValue]/*pnv2*/})}'

Set [MainAxisX] As '{[NewSetX]}'

Set [SetAxisY] As '{HIERARCHIZE ( [Sales Territory].[Sales
Territory].[Group].AllMembers )}'

,

Set [NewSetY] As '{NonEmpty([SetAxisY],[SetAxisX] * {/*pnv1*/
[Product].[Product Categories].[pnValue]/*pnv2*/})}'

Set [MainAxisY] As '{head([NewSetY],/*pnh1*/30/*pnh2*/)}'

Select

[Product].[Product Categories].[oceFP] on 0

//[MainAxisX] On Columns ,

//[MainAxisY] On Rows

//,{[Product].[Product Categories].[pnValue],[Product].[Product
Categories].[pnOrder Count*1]} on Axis(2)

From [Adventure Works]

WHERE ( [Measures].[Order Count]  )

cell properties value,formatted_value,font_name
```

MULTIDIMENSIONAL DATASET QUERY PROCESSING

RELATED APPLICATIONS

This application claims the benefit of priority under 35 USC 119(e) of U.S. Provisional Patent Application No. 61/771,872 filed Mar. 3, 2013. The contents of which are incorporated herein by reference in their entirety.

BACKGROUND

The present invention, in some embodiments thereof, relates to query processing and, more specifically, but not exclusively, to query processing in multidimensional dataset(s).

A multidimensional dataset is a variation of a relational model that uses multidimensional structures to organize data and express the relationships between data". The multidimensional dataset may be broken into cubes for prompt storage and access to data. Each cell within a multidimensional dataset contains aggregated data related to elements (for example measures) along each of its dimensions.

Multidimensional structure is quite popular for analytical databases that use online analytical processing (OLAP) applications.

In computing, OLAP applications are used to answering multi-dimensional analytical (MDA) queries swiftly. The multidimensional structure allows delivering answers to complex business queries swiftly. Data can be viewed from different angles, which gives a broader perspective of a flat problem. For example, OLAP is commonly used for arranging data for business intelligence. Typical applications of OLAP include business reporting for sales, marketing, management, reporting, business process management (BPM), budgeting and forecasting, financial reporting and similar areas, and agriculture. The OLAP enables users to analyze multidimensional datasets interactively from multiple perspectives.

SUMMARY

According to some embodiments of the present invention, there is provided a method of processing a query. The method comprises providing at least one multidimensional dataset having at least three dimensions formed according to a plurality of data tables associating between a plurality of persons and a plurality of roles and comprising a plurality of cells, receiving a query defining at least one factual value coordinated by at least one of the plurality of cells, the at least one factual value representing a measure defined in at least one of the plurality of data tables, deriving at least one person from the plurality of persons, the at least one person being associated with the with multidimensional dataset with the at least one cell, and outputting an indication of the at least one person in response to the query.

Optionally, the at least one multidimensional dataset comprises at least one online analytical processing (OLAP) cube.

Optionally, the at least one person comprises a plurality of persons.

More optionally, the outputting comprises presenting the plurality of persons as points in a diagram to demonstrate a relative contribution of each the persons to the at least one factual value.

More optionally, the deriving comprises calculating per each the person a trend representing a relative contribution of a respective the person to the at least one factual value in relation to at least one another person of the plurality of persons.

Optionally, the receiving comprises monitoring the plurality of cells during a monitoring period to identify when the at least one cell coordinates the at least one factual value and forwarding at least one notification to at least one user in response to the identification.

More optionally, the at least one person comprises a person having a predefined role, the at least one notification being forwarded to the at least one user.

Optionally, the outputting comprises establishing a communication connection between a user and the at least one person.

Optionally, the outputting comprises acquiring data pertaining to the at least person and adding the data to the indication.

According to some embodiments of the present invention, there is provided a method of monitoring a multidimensional dataset. The method comprises providing at least one rule which defines at least one a value threshold, a trend threshold, and a value range, scanning a plurality of cells of at least one multidimensional dataset having at least three dimensions formed according to a plurality of data tables and associating between a plurality of persons and a plurality of roles, identifying a group of the plurality of cells which coordinate at least one value that complies with the at least one rule, identifying at least one person associated with a plurality of members of the group, and generating a notification indicative of the at least one person.

Optionally, the scanning is performed iteratively.

More optionally, the method further comprises forwarding the notification to the at least one person.

Optionally, the at least one person comprises a plurality of persons; wherein the identifying comprises identifying for each the person a relative contribution of a respective the person to the compliance with the at least one rule in relation to another relative contribution of at least one another person of the plurality of persons.

Optionally, the at least one person comprises a plurality of persons; further comprising presenting the plurality of persons as points in a diagram to demonstrate a relative contribution of each the persons to a compliance with the at least one rule.

According to some embodiments of the present invention, there is provided a system of processing a query. The system comprises a database which stores at least one multidimensional dataset having at least three dimensions formed according to a plurality of data tables associating between a plurality of persons and a plurality of roles and comprising a plurality of cells, a user interface module installed in a client terminal and set to receive a query defining at least one factual value coordinated by at least one of the plurality of cells, the at least one factual value representing a measure defined in at least one of the plurality of data tables, and a server having a processor and a search module which uses the processor to process the at least one multidimensional dataset and to derive accordingly at least one person from the plurality of persons, the at least one person being associated with the with multidimensional dataset with the at least one cell. The server forwards an indication of the at least one person to the client terminal in response to the query.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A-7C include a transcript of a code for Query for getting growth delta and percent, according to some embodiments of the present invention.

DETAILED DESCRIPTION

Figure 1:
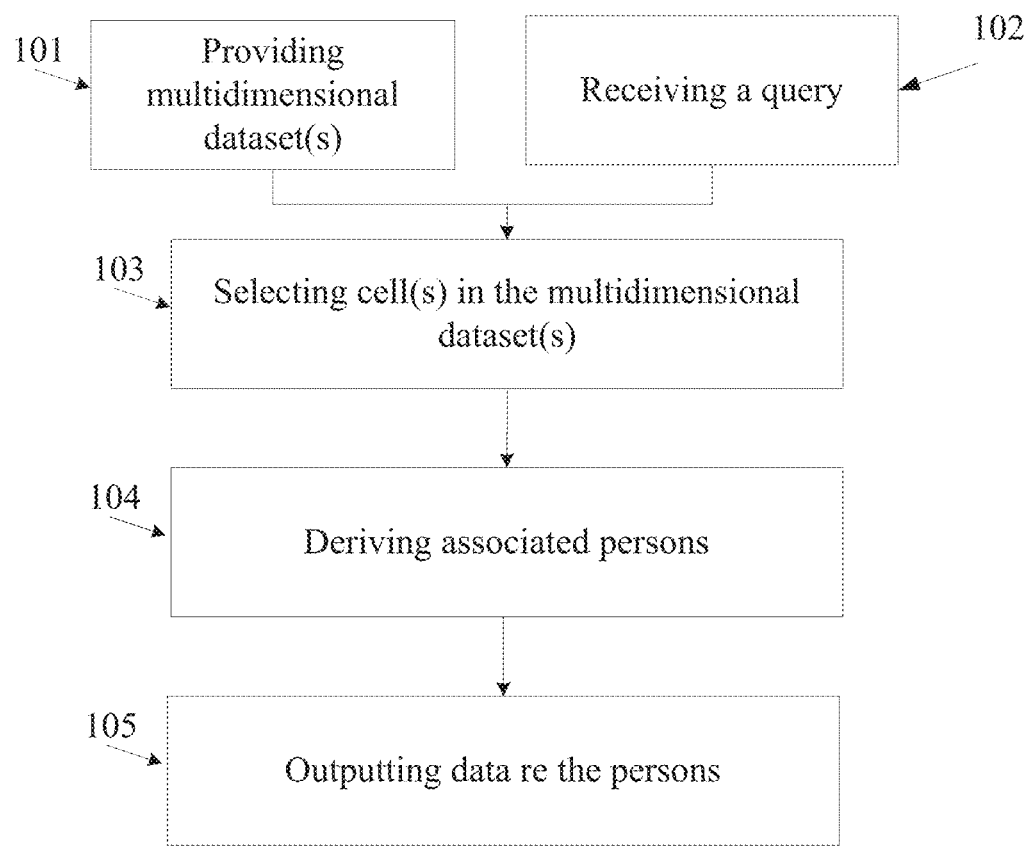
FIG. 1 is a method of processing multidimensional dataset(s) to identify one or more persons, according to some embodiments of the present invention.

The present invention, in some embodiments thereof, relates to query processing and, more specifically, but not exclusively, to query processing in multidimensional dataset(s).

According to some embodiments of the present invention, there are provided computerized methods and systems that identify person(s) associated with a certain value and/or trend of measures coordinated by one or more cells of multidimensional dataset(s). The methods and systems may be used to generate and display a comparative presentation of the contribution of the identified person(s) to the certain value and/or trend. For example, the comparative presentation may be a graph depicting trends in cells which are associated with certain persons. The certain value and/or trend may be manually selected by the user, for example in one or more factual tables presented to the user and/or automatically identified as complying with one or more rules, for instance by a monitoring module scannings the multidimensional dataset(s), for example periodically and/or iteratively.

According to some embodiments of the present invention, there are provided computerized methods and systems scanning multidimensional dataset(s) to identify a correlation between values and/or trends in one or more cells of the multidimensional dataset(s) and the association of certain persons with these cells. In such embodiments, persons who are associated with a number of cells showing a trend, such as a decline in growth, decline in sales, increase in consumer complaints, reduction in consumer traffic and/or the like, for example above a certain percentage, are identified. This allows a user to examine the performance of these persons and/or to change the composition of a team allocated to handle a certain business event documented in the multidimensional dataset(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a method of processing multidimensional dataset(s) to identify one or more persons associated with one or more requested values and/or trends of measures coordinated by cells in the multidimensional dataset(s), such as OLAP cube(s), according to some embodiments of the present invention. Exemplary measures may be sales, profits, orders, cost, event count, tasks, expenses, client evaluation, evaluated promotion success and/or any other factual indicator.

Figure 2:
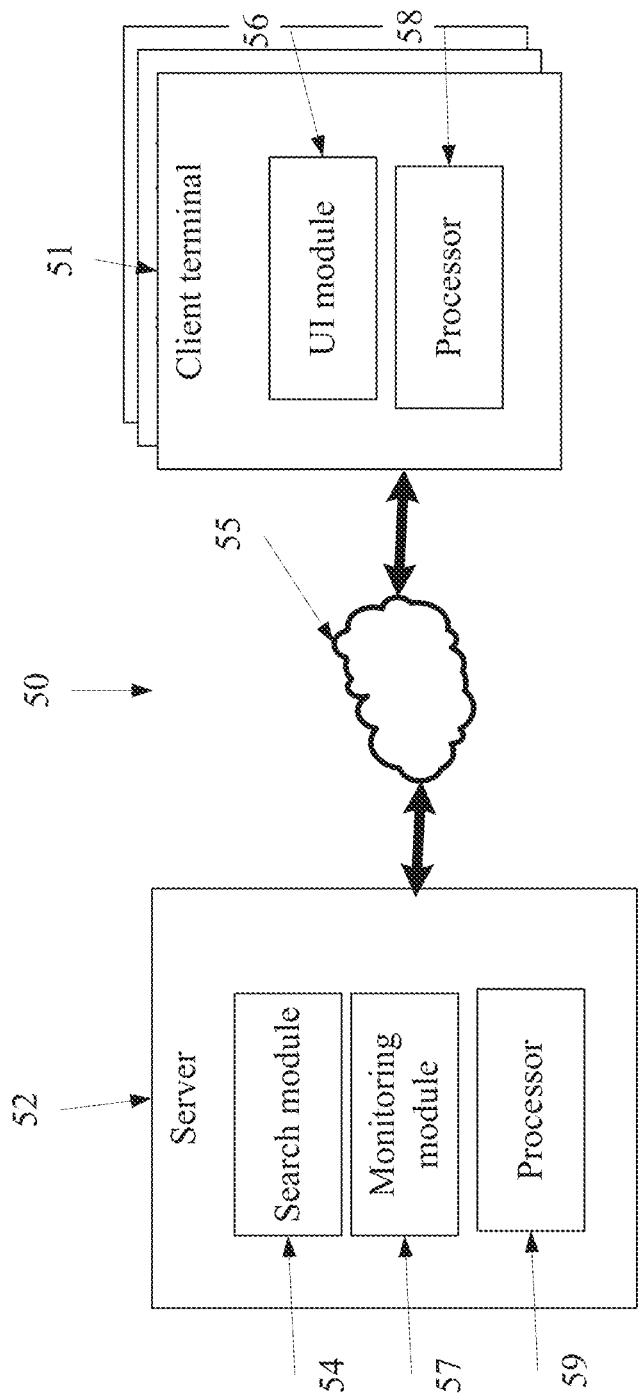
FIG. 2 is a schematic illustration of a system of processing multidimensional dataset(s) to identify one or more persons based on a query, according to some embodiments of the present invention.

Reference is also made to FIG. 2 which is a schematic illustration of an exemplary system of processing multidimensional dataset(s) to identify one or more persons based on a query, according to some embodiments of the present invention. The system 50 includes a user interface (UI) module 56 set to present a user interface, for example as described below. The user interface module 56 is installed or executed on a client terminal 51, such as a laptop, a desktop, a thin client, a Smartphone, a tablet and/or the like. The system 50 includes a server 52 which communicates with the client terminal 51 via a network 55. It should be noted that any number of user interface module 56 may communicate via the client terminals 51 with the server 51, facilitating any number of users to use the system 50, for instance as described below, either as a Ethernet based system, a Software as a service (SaaS) and/or the like. In some embodiments, the client terminal hosts the modules of the server, forming a standalone system 50. The server 52 may include a search module 54 for processing queries received from the client terminal 51, for example as described below. The server 52 may include a monitoring module 57 for monitoring trends and/or changes in cells of multidimensional dataset(s) 53. Both the client terminal 51 and the server 52 use processors 58, 59 such as central processing units (CPUs).

Based on the above method 100 and/or system 50, a user and/or the monitoring module 57 may scan the multidimensional dataset(s) to spot cells with one or more values of measures which are indicative of an irregularity and/or a desired and/or an undesired outcome and/or event, such as increase/decrease in sales, reduction/increase in cost, increase/decrease in store traffic, reduction/increase in a number of complaints, and/or the like. The method allows identifying one or more persons which are associated with these values.

As used herein, and for brevity, a multidimensional dataset also means multidimensional datasets and may be an OLAP cube, also referred to as a hypercube. The multidimensional dataset is optionally generated by correlating between tables wherein persons are associated with roles related to the measures are documented or linked to the tables. As used herein, and for brevity, a person means an individual such as a worker, a manager, a contractor, a supplier and/or a set of persons and/or a unique identifier (ID) of a person, such as a name, an email address, a worker ID, a telephone number, a home address and/or the like. For example, the multidimensional dataset may be generated from a plurality of tables related to a business entity, for example a company and/or a chain of stores. The multidimensional dataset contains organizations related data indicative of person involvement. In such embodiments, the persons may be employees, resellers, retailers, contractors, store managers, advertisers, and/or the like.

In a multidimensional dataset, such as an OLAP cube, persons may be connected, either directly or indirectly, to a certain cell that coordinates a value of a measure, for example a value from a contingency table also referred to as a crosstab.

Persons associated to a value or trend in a selected cell may be identified in the multidimensional dataset according to semantics of the multidimensional dataset, for instance from the tags of the columns and/or rows whose attribute type is persons or unique IDs of persons.

In use, the user may use the information about relation(s) between certain person(s) and certain outcomes and/or events (for example trends) for evaluating the performances of the certain person(s) and their contribution (negative and/or positive) to one or more documented measures.

Based on the identification, a feedback may be provided to the persons, for example by establishing a communication (discussion) with the persons, for instance establishing a call and/or setting a meeting, optionally automatically, sending emails to the persons, optionally automatically, and/or presenting data to the persons, optionally automatically.

Additionally or alternatively, a monitoring module may identify exceptional, irregular, anomaly, and/or desired values in the multidimensional dataset(s) according to a predefined set of rules and automatically generate notification accordingly. For example, in such embodiments, a person having a predefined role, for example a manager, identified as a person associated to a certain cell in the multidimensional dataset(s) is notified when the value and/or trend coordinated by the certain cell exceeds and/or falls short a certain reference range and/or value and/or rate.

As shown at 101, one or more multidimensional datasets, for brevity referred to herein as a multidimensional dataset, are provided. The multidimensional dataset has three dimensions or more includes a plurality of cells, also known as fields. Each cell coordinates factual value(s) representing a measure defined in one or more of a plurality of data tables, for example as described above. The factual value(s) may be analyzed to conclude trends of respective measures. The data tables optionally associating between persons and roles, for example indicating which person has a certain role in a store, a shift, a project and/or any event measured and evaluated by the values documented in the multidimensional dataset.

Now, as shown at 102, a query defining one or more factual values coordinated by one or more of the cells is received. The query is optionally created according to a selection of a user that is made with respect to a presentation of values documented in cells of the multidimensional dataset. For example, a user interface (UI) that allows user to select values which are depicted in a presentation of a part of the multidimensional dataset, for example a two dimensional (2D), a three dimensional (3D), and a four dimensional presentation (for example, 3D presentation that varies over time and/or a set of 3D presentations). Optionally, the UI module is an add-on and/or an integrated function in a data access application that presents data tables which are coordinated in a multidimensional dataset. Additionally or alternatively, the query may be optionally defined as a database query, facilitating the derivation of one or more cell, for example an OLAP cube query. The query may be sent in response to a user selection indicative of a request to identify persons related to a value of a certain measure, for example by clicking or touching a button titled "find related handling party/person/individual". As shown at 103, the one or more cells which store one or more value(s) and/or indicative of the one or more selected and/or requested value (s) are derived based on the query.

As shown at 104, this allows deriving one or more persons from the persons documented in the multidimensional dataset, for example as unique IDs. The person(s) are associated, in the multidimensional dataset, with the derived cell.

Optionally, derived persons are ranked, scored and/or ordered according to their contribution to the derived value which complies with the query. For example, if the measure is sales during a certain period, persons may be ranked, scored and/or ordered according to a change in sales (i.e. growth) during the monitored period, the number of shifts they were included in during the certain period, their role, for example based on a table that matches roles and/or scores.

Figure 3:
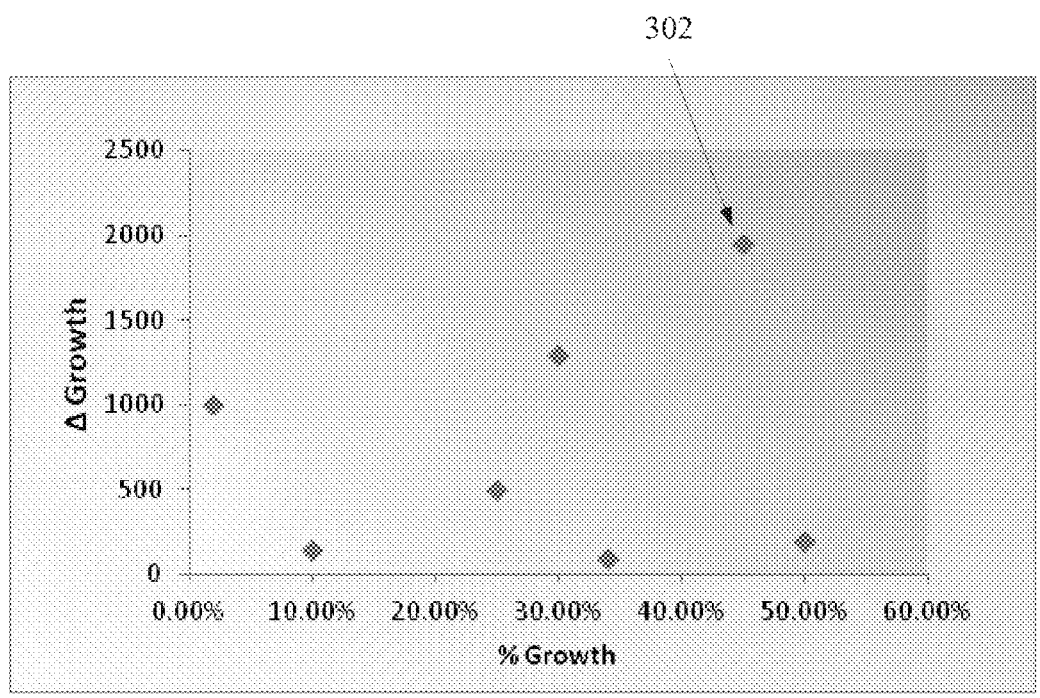
FIG. 3 is an exemplary user interface that plots points on a two dimensional graph having measure trends as axes, according to some embodiments of the present invention.

Now, as shown at 105, the ID(s) of the one or more persons are outputted in response to the query, for example presented on a UI and/or sent in a notice to a designated user. Optionally, data regarding the identified persons is also gathered and provided with the ID(s) of the persons. For example, FIG. 3 is an exemplary UI that plots points on a 2D graph having measure trends as axes. In particular, the exemplary UI presents a table depicting two measures, Growth value and Growth percentage and points representing value trends based on values extracted from the multidimensional dataset, for example such as 302. The Growth value and Growth percentage per person are calculated according to data from different dates, for example as exemplified below.

Figure 4:
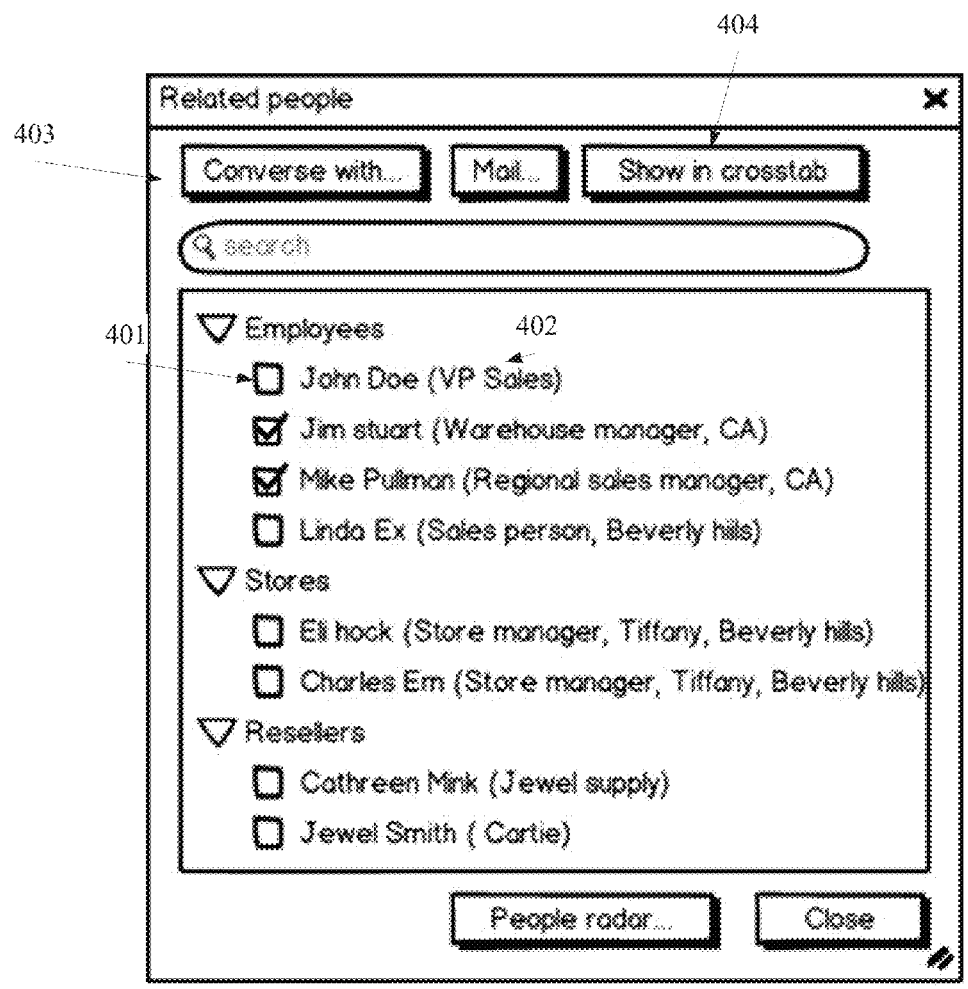
FIG. 4 is a dialog box that presents person records of persons selected using by the UI, for example people who are selected by the rectangle, according to some embodiments of the present invention.

Optionally, the user may draw a rectangle around one or more areas of interest in the presented graph. Optionally, the UI includes a button allowing a user to receive data on persons represented by points within the rectangle. For example, FIG. 4 is a dialog box that presents person records of persons selected using by the UI, for example people who are selected by the rectangle.

Each person record is optionally shown with an indication about the dimension from which it is taken, for example 401. Each person record is optionally shown information about the respective person, for example as shown at 402. Optionally, additional information is acquired using user databases, historical logs, third party sources and/or the like. Optionally, the dialog allows the user to communicate with one or more of the selected persons, for example by sending a mail and/or establishing a call, see for example 403. It should be noted that communication may be established with different persons, for example registered and unregistered users.

Optionally, the dialog allows the user open the contingency table in which the person appears, see for example 404.

According to some embodiments of the present invention, one or more persons which are associated with a number of cells showing a common trend and/or change are identified. For example, reference is made to FIG. 5, which is a flowchart of a method of identifying one or more persons having a specific effect of measures documented in a multidimensional dataset, according to some embodiments of the present invention.

First, as shown at 501, cells in a multidimensional dataset are selected. For example, the cells are manually marked by a user reviewing the cells and/or associated values, for example using a UI that displays tables documented in the multidimensional dataset. Additionally or alternatively, the cells are automatically selected by a monitoring module which reviews the value(s) and/or trend(s) coordinated by the cells, for example iteratively and/or upon updating of the cells. Optionally, the selected cells coordinate similar value(s) and/or trend(s). Optionally, selected cells coordinate values and/or trends which comply with one or more rules, for example a decrease in growth and/or an increase in cost during a period and/values that comply with a certain rule, for example sales above a threshold and/or cost below a threshold is automatically marked.

Now, as shown at 502, a first group of persons associated with the marked cells is identified. The members of the group are optionally scored (including ranked), for instance as described above. The identification and/or scoring of each person is optionally made according to the cumulative contribution of the person to values and/or trends in the marked cells, for example to the growth (positive or negative), cost (positive or negative), and traffic (positive or negative).

As shown at 503, for each cell, persons associated with the trend(s) and/or value(s) which are coordinated by the cell are identified and added to a second group. The members of the second group are optionally scored (including ranked), for instance as described above. The identification and/or scoring of each person are optionally made according to her contribution to value and/or trend in the respective marked cell, for example to the growth (positive or negative), the cost (positive or negative), and the traffic (positive or negative).

Now, as shown at 504, an intersection between the first and the second groups 502, 503 is found, indicating which persons have a substantive negative and/or positive effect on measures documented in the multidimensional dataset.

Figure 6:
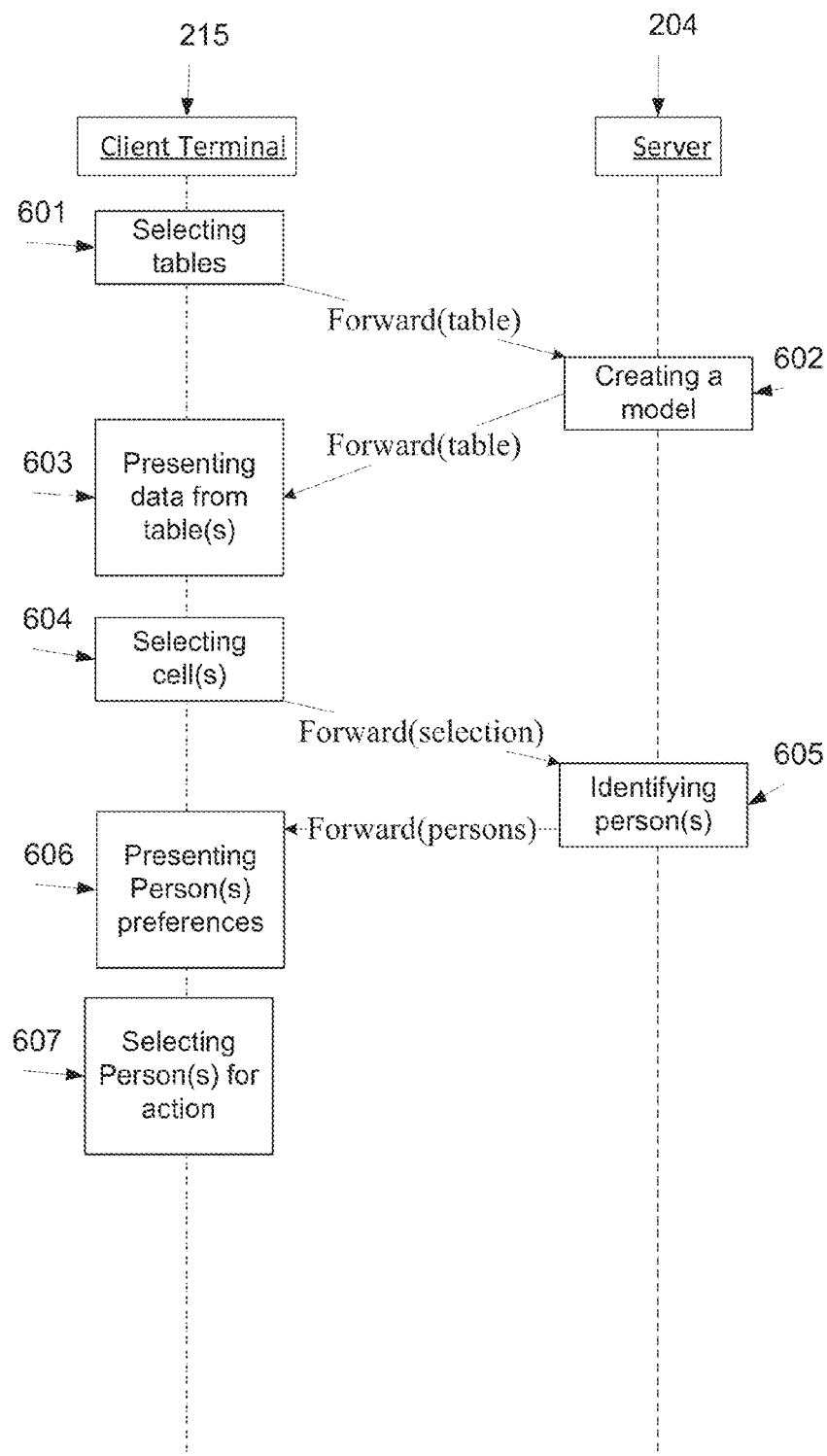
FIG. 6 is another flowchart of a method for identifying one or more persons which are associated with one or more requested values, according to some embodiments of the present invention.

Reference is now also made to FIG. 6, which is another flowchart 500 of a method for identifying one or more persons associated with one or more requested values, according to some embodiments of the present invention. The method depicted in flowchart 500 is an exemplary case of the method depicted in FIG. 1. In use, for example as shown at 601, the user selects on a client terminal, one or more tables, for example sales tables, cost tables, and/or the like, for instance comma separated values (CSV) files. As shown at 602, the selected tables are optionally forwarded to a server that creates accordingly a semantic layer, also referred to as a model, with a person business type for relevant rational database (RDB) columns in the various tables. The server may be a business intelligence (BI) server. The model optionally contains aggregated values of measures from dimensions. Each dimension is equivalent to another RDB table, for example customers, products, employees, and promotions. The model optionally contains attributes. Each attribute is equivalent to an RDB field and has a business type, such as a person, an email, a year, a quarter, a city, and/or a state. Optionally, an attribute contains a member collection, for example a customer age attribute in the customers dimension contains a list of ages. The member collection may be derived from distinct values of a relevant cell.

Now, as shown at 603, data from the selected tables, which are optionally documented in an OLAP cube, is presented to the user, allowing her to select one or more cell(s) in a crosstab. For example, a cell coordinated with values representing a decrease in sales, for example more than 5%, is selected.

Figure 5:
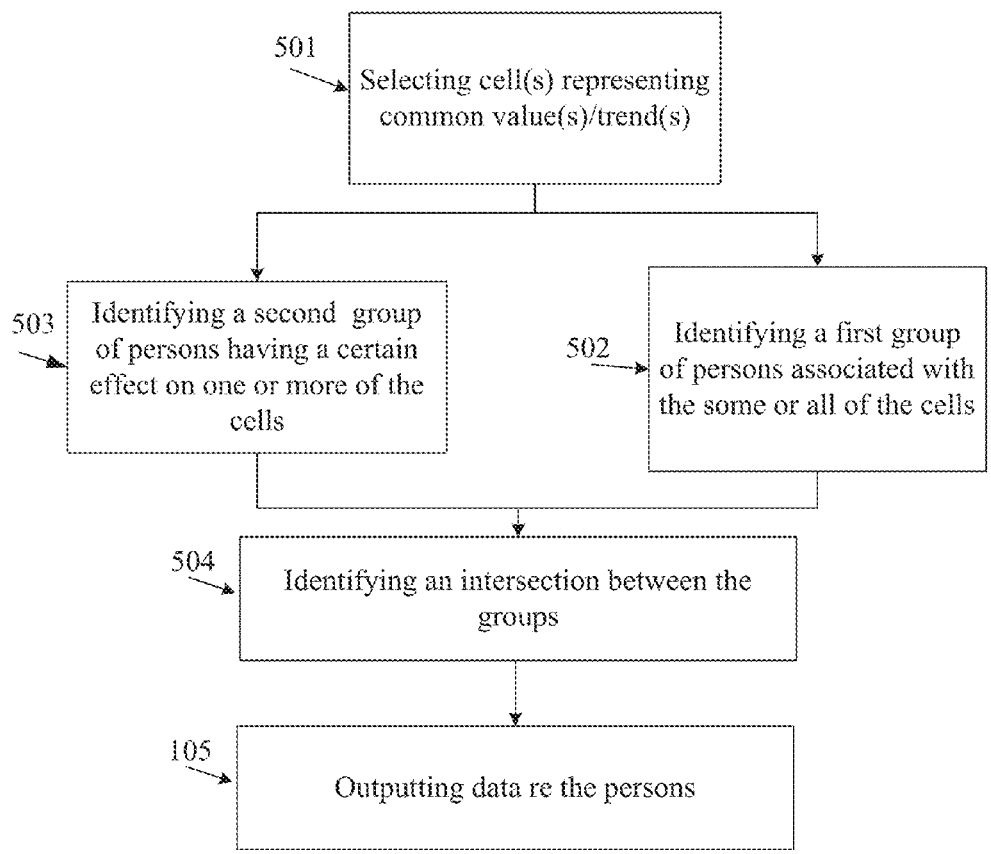
FIG. 5 is a flowchart of a method of identifying one or more persons having a specific effect of measures documented in a multidimensional dataset, according to some embodiments of the present invention.

As shown at 604, the selection is forwarded to the server which, as shown at 605, identifies accordingly one or more related persons based on the semantics of the created model, for instance from the identified cells. For example, the server takes data cell coordinates, for example sales, Q3 2010, California, and dairy products category, and perform, for each attribute that includes a person executes query, such as an multidimensional expressions (MDX) query, to extract attribute members related to the value in the selected cell out of the Cartesian product of rows from tables in a join (CROSS JOIN) of cell coordinates and attribute members. This allows the server to gather relevant members from the attributes which describe persons and optionally, for each member, to execute an MDX query to acquire values of current and previous period(s) for indicating to the user a contribution of each person associated with the cell value to the cell value. For example, if the current period is first quarter (Q1) 2009, a previous period is fourth quarter (Q4) 2008 and if a current period is May 2010 a previous is April 2010 for the value of the CROSS JOIN of the member with the cell coordinates. In such a manner, the server gathers growth and delta between these periods per person. FIG. 5 includes a code for generating a Query for getting growth delta and percent of persons documented in an OLAP cube.

Now, as shown at 606, the server may respond to the received query with members with performances of the persons, for example a certain delta and/or growth of each person, for example on a scatter chart, for instance as depicted at FIG. 3.

As shown at 607, this allows a user to select persons for a certain action. For example, the user can mark area(s) containing person indications in certain congestion or other areas of interest (high delta or high growth) on the chart and to connect to these people accordingly and/or to present information about these persons.

Reference is now made to another exemplary query session between a server and a client terminal, according to some embodiments of the present invention.

When a user submits a query via a client terminal, the client terminal sends to the server (another utilities function) coordinates of a selected cell\member (for member, coordinate of orthogonal axis dimensions may not be sent). The server resolves a list by scanning for attributes of type (PAtt): customers, person, and channel. For each found attribute, the server is searching for its dimension for attributes of type (MailAtt): WebMailAlias and PersonContact. The server may also look for attributes of type (OrgAtt) for more information on the people: OrganizationalUnit and OrgeliTitle. The server may also look for attributes of type (OtherAtt) for more information on the people: company and address. The server may also look into boxa information. For example, the Server runs the following query, for each PAtt:

```
With member [Measures].[pnTemp] as
'Generate(NonEmpty(PAtt1,{(all coordinates)},
cstr(PAtt1.dimension.uniquename)+ "|" +
cstr(PAtt1.currentmember.uniquename)+ "|" +
cstr(Patt1.currentmember.member_caption + "|" +
cstr(MailAtt1.currentmember.member_caption + "|" +
cstr(OrgAtt1.currentmember.member_caption + "|" +
cstr(OrgAtt12.currentmember.member_caption, "|")
cstr(OtherAtt1.currentmember.member_caption + "|" +
cstr(OtherAtt12.currentmember.member_caption, "|")
```

For example, in the following XML:

```
<Person>
    <DimCaption>Dim caption</DimCaption>
    <DimName>Dim uniquename</DimName >
    <Caption>person name</Caption>
    <UName>person member unique name</UName>
    <Mail>person email</Mail>
    <Unit>person unit</Unit>
    <Title>person title</Title>
    <Company>person company</Company>
    <Address>person address</Address>
    <IsADUser>True/False</ IsADUser >
    <IsNecto >True/False</ IsNecto >
    <DeltaGrowth>-24544 </ DeltaGrowth >
    <PercentGrowth>-0.23</ PercentGrowth >
</Person>
```

The following structure is received for each member as defined:

```
Dimension caption;
Person unique name;
Person caption;
Mail (empty string if does not exist);
```

```
Org Unit (empty string if does not exist);
Org Title (empty string if does not exist);
Company name (empty string if does not exist);
Address (empty string if does not exist).
```

The server responds to the query from the client terminal with the identified information. The client terminal may request for missing information from directory services (e.g. Active directory) and/or a designated service, for example by forwarding the received information and getting in response more detailed information. The admin and/or the designated service provided the additional data based on authorization data associated with the user (registered/not registered). Now, the server may acquire the additional information by querying for growth delta and percent of associated people, for example as detailed in the code in FIGS. 7A-7C. The server fills up XML received from client terminal and sends back to the client terminal. The client terminal shows the list, optionally in groups (folders) divided by dimension caption. After caption client terminal shows in brackets all external information (if exists) separated by ',', for example Unit, Title, Company, and address.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a processor, a module and a multidimensional dataset is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for processing a query, comprising executing on a processor the steps of:
providing at least one multidimensional dataset comprising at least one online analytical processing (OLAP) cube and having at least three dimensions formed according to a plurality of data tables and comprising a plurality of cells, said plurality of data tables associating between a plurality of persons and a plurality of roles;
receiving a query defining at least one factual value, said at least one factual value representing a measure defined in at least one of said plurality of data tables;
searching through said at least one multidimensional dataset to identify at least one cell of said plurality of cells, coordinating said at least one factual value;
identifying at least person from said plurality of persons in said at least one multidimensional dataset, said at least one person being associated with said at least one cell coordinating said at least one factual value; and
outputting an indication of said at least one person in response to said query.

2. The method of claim 1, further comprising deriving at least one another person from said plurality of persons, said at least one another person being associated with said multidimensional dataset with said at least one cell; and further comprising
outputting an indication of said at least one another person in response to said query.

3. The method of claim 2, wherein said outputting comprises presenting said at least one person and said at least one another person as points in a diagram to demonstrate a relative contribution of each said at least one person and said at least one another person to said at least one factual value.

4. The method of claim 2, wherein said deriving at least one person comprises calculating per each said person a trend representing a relative contribution of a respective said person to said at least one factual value in relation to said at least one another person.

5. The method of claim 1, wherein said receiving comprises monitoring said plurality of cells during a monitoring period to identify when said at least one cell coordinates said at least one factual value and forwarding at least one notification to at least one user in response to said identification.

6. The method of claim 5, wherein said at least one person comprises a person having a predefined role, said at least one notification being forwarded to said at least one user.

7. The method of claim 1, wherein said outputting comprises establishing a communication connection between a user and said at least one person.

8. The method of claim 1, wherein said outputting comprises acquiring data pertaining to said at least person and adding said data to said indication.

9. A non-transitory computer readable medium comprising computer executable instructions adapted to perform the method of claim 1.

10. A computer-implemented method for monitoring a multidimensional dataset, comprising executing on a processor the steps of:
providing at least one rule which defines at least one of a value threshold, a value trend threshold, and a value range;
scanning a plurality of cells of at least one multidimensional dataset comprising at least one online analytical processing (OLAP) cube and having at least three dimensions formed according to a plurality of data tables, said plurality of data tables associating between a plurality of persons and a plurality of roles;
identifying a group of said plurality of cells which coordinate at least one value that complies with said at least one rule;
identifying at least one person associated with a plurality of members of said group of said plurality of cells; and
generating a notification indicating said at least one person.

11. The method of claim 10, wherein said scanning is performed iteratively.

12. The method of claim 10, further comprising forwarding said notification to said at least one person.

13. The method of claim 10 further comprising identifying at least one another person associated with said plurality of members of said group; wherein said identifying at least one person comprises identifying for each said person a relative contribution of a respective said person to the compliance with said at least one rule in relation to another relative contribution of said at least one another person;
and further comprising
generating a notification indicative of said at least one another person.

14. The method of claim 13 wherein said at least one person and said at least one another person are at least one of ranked, scored and ordered according to said relative contribution.

15. The method of claim 10 further comprising identifying at least one another person associated with said plurality of members of said group; further comprising presenting said at least one person and said at least another person as points in a diagram to demonstrate a relative contribution of each said persons to a compliance with said at least one rule; and further comprising
generating a notification indicative of said at least one another person.

16. The method of claim 10, wherein each of said at least one of said value threshold, said value trend threshold and said value range is associated with at least one of an exceptional value, an irregular value, an anomaly and a desired value.

17. A system for processing a query, comprising:
a database which stores at least one multidimensional dataset comprising at least one online analytical processing (OLAP) cube and having at least three dimensions formed according to a plurality of data tables and comprising a plurality of cells, said plurality of data tables associating between a plurality of persons and a plurality of roles;
a user interface module installed in a client terminal and comprising executable code executed by said client terminal for receiving a query defining at least one factual value coordinated by at least one of said plurality of cells, said at least one factual value representing a measure defined in at least one of said plurality of data tables;

a server having a processor and a search module which uses said processor, wherein said search module comprising executable code executed by said processor for processing said at least one multidimensional dataset, for searching through said at least one multidimensional dataset to identify said at least one cell coordinating said at least one factual value and for identifying at least person from said plurality of persons in said at least one multidimensional dataset, said at least one person being associated with said at least one cell coordinating said at least one factual value; and wherein said server forwards an indication of said at least one person to said client terminal in response to said query.

18. The system of claim 17 wherein said user interface module installed in said client terminal further comprising executable code executed by said client terminal for requesting for missing information associated with said at least one person from a directory services.

* * * * *